United States Patent
Hertlein et al.

(10) Patent No.: US 12,472,383 B2
(45) Date of Patent: Nov. 18, 2025

(54) DEVICE AND METHOD FOR TUNING A CHARGED PARTICLE BEAM POSITION

(71) Applicant: ION BEAM APPLICATIONS, Louvain-la-Neuve (BE)

(72) Inventors: David Chris Hertlein, Louvain-la-Neuve (BE); François Vander Stappen, Louvain-la-Neuve (BE); Rudi Labarbe, Louvain-la-Neuve (BE)

(73) Assignee: ION BEAM APPLICATIONS, Louvain-la-Neuve (BE)

(*) Notice: Subject to any disclaimer, the term of this patent is extended or adjusted under 35 U.S.C. 154(b) by 354 days.

(21) Appl. No.: 18/224,643

(22) Filed: Jul. 21, 2023

(65) Prior Publication Data
US 2024/0024702 A1  Jan. 25, 2024

(30) Foreign Application Priority Data
Jul. 22, 2022 (EP) ..................... 22186551

(51) Int. Cl.
*A61N 5/10* (2006.01)
*H05H 7/04* (2006.01)
*H05H 13/00* (2006.01)

(52) U.S. Cl.
CPC ......... *A61N 5/1067* (2013.01); *A61N 5/1043* (2013.01); *A61N 5/1078* (2013.01);
(Continued)

(58) Field of Classification Search
None
See application file for complete search history.

(56) References Cited

U.S. PATENT DOCUMENTS

| | | |
|---|---|---|
| 10,195,465 B2 | 2/2019 | Gordon et al. |
| 2018/0111007 A1* | 4/2018 | Gordon ............... A61N 5/1067 |
| 2018/0326224 A1* | 11/2018 | Umezawa ............ A61N 5/1043 |

FOREIGN PATENT DOCUMENTS

| | | |
|---|---|---|
| EP | 2639598 A1 | 9/2013 |
| EP | 2552545 B1 | 2/2015 |

(Continued)

OTHER PUBLICATIONS

European Search Report in counterpart European Patent Application No. EP22186551, completed on Dec. 20, 2022, (6 pages).

*Primary Examiner* — Eliza W Osenbaugh-Stewart
(74) *Attorney, Agent, or Firm* — Finnegan, Henderson, Farabow, Garrett & Dunner, LLP

(57) ABSTRACT

A particle therapy apparatus configured to scan a charged particle beam over a target according to a pre-defined treatment field which covers a treatment surface in an isocenter plane of the apparatus. The apparatus is capable of scanning the beam over a reachable surface which covers and is larger than the treatment surface. A beam stopper is arranged downstream of the scanning magnets of the apparatus, at a position to prevent the beam from reaching at least a portion of the reachable surface and to allow the beam to reach any portion of the treatment surface. A control system is configured to control the apparatus to direct the beam to the beam stopper and to meanwhile measure a position of the beam, to calculate a difference between a desired position and the measured position of the beam when directed to the beam stopper, and to scan the beam over the target according to the pre-defined treatment field by taking into account the calculated difference.

17 Claims, 2 Drawing Sheets

(52) U.S. Cl.
CPC .............. *H05H 7/04* (2013.01); *A61N 5/1045* (2013.01); *A61N 2005/1087* (2013.01); *H05H 2007/046* (2013.01); *H05H 13/00* (2013.01); *H05H 2277/11* (2013.01)

(56) References Cited

FOREIGN PATENT DOCUMENTS

| | | | |
|---|---|---|---|
| EP | 2532385 | B1 | 4/2015 |
| EP | 2833970 | B1 | 5/2016 |

\* cited by examiner

DEVICE AND METHOD FOR TUNING A CHARGED PARTICLE BEAM POSITION

CROSS REFERENCE TO RELATED APPLICATIONS

This application claims priority of European patent application no. EP22186551.2 filed on Jul. 22, 2022, which is incorporated herein by reference in its entirety.

TECHNICAL FIELD

The present disclosure relates to a device and method for tuning a charged particle beam position, more particularly for tuning a charged particle beam position in a charged particle beam therapy apparatus.

BACKGROUND

Charged particle beam therapy apparatus for treating targets such as tumors in a patient with such charged particle beam are known for years. It is also known that the position of the charged particle beam has to be tuned so that it corresponds to a desired position when irradiating the target with the beam.

This tuning is even more relevant when the particle beam is scanned over the target.

Pencil Beam Scanning (hereafter referred to as PBS) makes, for example, use of a tuning spot to ensure the proper alignment of the pencil beam for each layer in the target to be irradiated. In order to do this, a "tuning" loop is used. The tuning loop checks the position of the unscanned beam on ionization chambers (IC) and calculates an offset to apply to the scanning magnets in order to achieve the correct absolute spot positioning at isocenter.

The method described in EP2552545B1 uses a PBS scanning algorithm that chooses the tuning spot on each layer of the target by finding the highest dose spot within the layer and irradiates this spot with the lowest possible dose, checking meanwhile the position of the beam on the ionization chambers. From the positions measured on the ionization chambers, it can be geometrically determined/calculated where the spot landed within the target volume. A correction to the scanning magnets is then applied and the spot is irradiated again and the position of the beam is checked again on the ionization chambers. This process is known as a tuning loop. All the dose delivered for this tuning spot during the tuning loop is measured and subtracted from the spot's dose to ensure that the desired dosimetry is respected for this spot. As stated at paragraph 57 of EP2252545B1, "by using the irradiation device and method of the invention, there is no need to insert a beam stop between the irradiation unit and the target during a tuning phase." This provides a gain of time in controlling the beam position and the treatment machine is also kept simple. This method is however not adapted when doses at high dose rates are to be delivered in a single scan to the target such as with FLASH irradiation techniques, for example.

With FLASH therapy treatment, a single scan of the beam is performed over a ridge filter at very high dose rate to irradiate the target volume at once. If the conventional PBS tuning loop described hereinabove was to be deployed, this would proportionally imply that the tuning spot dose would be much higher because a higher dose rate will deliver proportionally more dose in a given time. This higher dose tuning spot would furthermore lower the dose rate for the PBS field and risks negating the FLASH effect. Decreasing the dose rate during the tuning spot is sub-optimal because the tuning would be done with beamline conditions that are different from the conditions that would be used during therapeutic beam delivery and the results of the tuning may not be transposable from one beamline condition to another.

In the prior art, alternative methods for beam position control have been proposed.

EP2833970B1 describes a method where the beam position correction data can be introduced into the beam steering data set or are automatically introduced after running a therapy-independent test irradiation data set. This method proposes a beam position correction model developed following a test of the treatment machine before treatment of the patient and therefore takes time which can't be used for the treatment of the patient.

U.S. Ser. No. 10/195,465B2 is directed to a system for providing real-time correction of the position of a charged particle beam. The system can be used when a patient is in his treatment position at isocenter, for example, during therapeutic treatment. In this case, a mobile beam stop is disposed between a detector apparatus and scanning magnets. The beam stop can block the beam from reaching the patient during retuning/calibration/setup, without having to move the patient, and allow beam to pass and reach the patient when the retuning/calibration/setup is complete, for example, to provide therapy to the patient. The beam stop can, for example, be a solid object that moves orthogonally to the beam in the X or Y direction, like a swing or guillotine. The measurement of the beam position and the correction of the deflectors are done before the scanning magnets. This solution is however not adapted to take into account the position errors that could be introduced by the scanning magnets. It is also complex and expensive due to the need for a mobile beam stop whose movement may moreover be subject to failures, in which case wrong doses may be delivered to the patient.

SUMMARY

The present disclosure addresses the problems of the state of the art devices and methods to tune the position of a charged particle beam in a particle therapy apparatus.

According to the present disclosure, there is provided a particle therapy apparatus comprising:
- a particle accelerator to deliver a charged particle beam;
- a beam transport system to deliver the charged particle beam according to a main beam axis (Z) to a target in an isocenter plane which is perpendicular to the main beam axis (Z);
- scanning magnets to scan the charged particle beam over the target;
- a beam position detector arranged downstream of the scanning magnets and adapted to detect an X and Y position of the charged particle beam when it crosses the detector;
- a beam stopper arranged downstream of the beam position detector, the beam stopper being adapted to stop the charged particle beam when it hits the beam stopper; and
- a control system configured to drive the scanning magnets to scan the charged particle beam over the target according to a pre-defined treatment field which covers a treatment surface in the isocenter plane, the control system being further capable to drive the scanning magnets to scan the charged particle beam according to a reachable field which covers a reachable surface in the isocenter plane, the reachable surface covering and being larger than the treatment surface.

The beam stopper is arranged at a position to prevent the charged particle beam from reaching at least a portion of the reachable surface and to allow the charged particle beam to reach any portion of the treatment surface.

The control system is configured to control the particle therapy apparatus:
- to direct the charged particle beam to the beam stopper and to meanwhile measure an X and Y position of the charged particle beam by using the beam position detector,
- to calculate a difference between a desired X and Y position of the charged particle beam and respectively the measured X and Y position of the charged particle beam when directed to the beam stopper, and
- to scan the charged particle beam over the target according to the pre-defined treatment field by taking into account the calculated difference.

Indeed, since the beam stopper is located downstream of the scanning magnets, the apparatus according to the present disclosure is adapted to take into account beam position errors that could be introduced by the scanning magnets.

Furthermore, since the beam stopper is arranged at a position to prevent the charged particle beam from reaching at least a portion of the reachable surface and to allow the charged particle beam to reach any portion of the treatment surface, it does not have to be removed to irradiate the target with the treatment field, thereby saving treatment time.

Furthermore, the apparatus according to the present disclosure is well adapted for FLASH therapy since there will be no or almost no influence of the beam position tuning steps on the doses delivered to the target during the treatment.

In accordance with some embodiments, the control system is configured to control the particle therapy apparatus to scan the charged particle beam over the target according to the pre-defined treatment field by correcting the beam position according to the difference between the desired X and Y position of the charged particle beam and the measured X and Y position of the charged particle beam when directed to the beam stopper.

In accordance with some embodiments, the beam stopper is kept in place while the charged particle beam is scanned over the target according to the pre-defined treatment field.

As a consequence, time is saved for patient treatment and the apparatus is also more reliable because of the absence of movement of the beam stopper. The absence of movement of the beam stopper makes the apparatus also safer because it eliminates or mitigates the risk of an incorrect positioning of the beam stopper after it would otherwise have been moved.

In accordance with some embodiments, the beam stopper is arranged as close as possible to the main beam axis (Z), which allows for a more accurate tuning of the beam position.

In accordance with some embodiments, the particle accelerator is a cyclotron or a synchrotron.

In accordance with some embodiments, the charged particle beam is a beam of protons or of carbon ions.

It is to be noted that, as is conventional with particle therapy apparatus, the said X and Y axis form an orthogonal referential with the Z axis.

The present disclosure also concerns a method for tuning the position of a charged particle beam in a particle therapy apparatus.

BRIEF DESCRIPTION OF THE FIGURES

These and further aspects of the present disclosure will be explained in greater detail by way of examples and with reference to the accompanying drawings in which.

The drawings of the figures are neither drawn to scale nor proportioned. Generally, similar or identical components are denoted by the same reference numerals in the figures.

DETAILED DESCRIPTION

Figure 1:
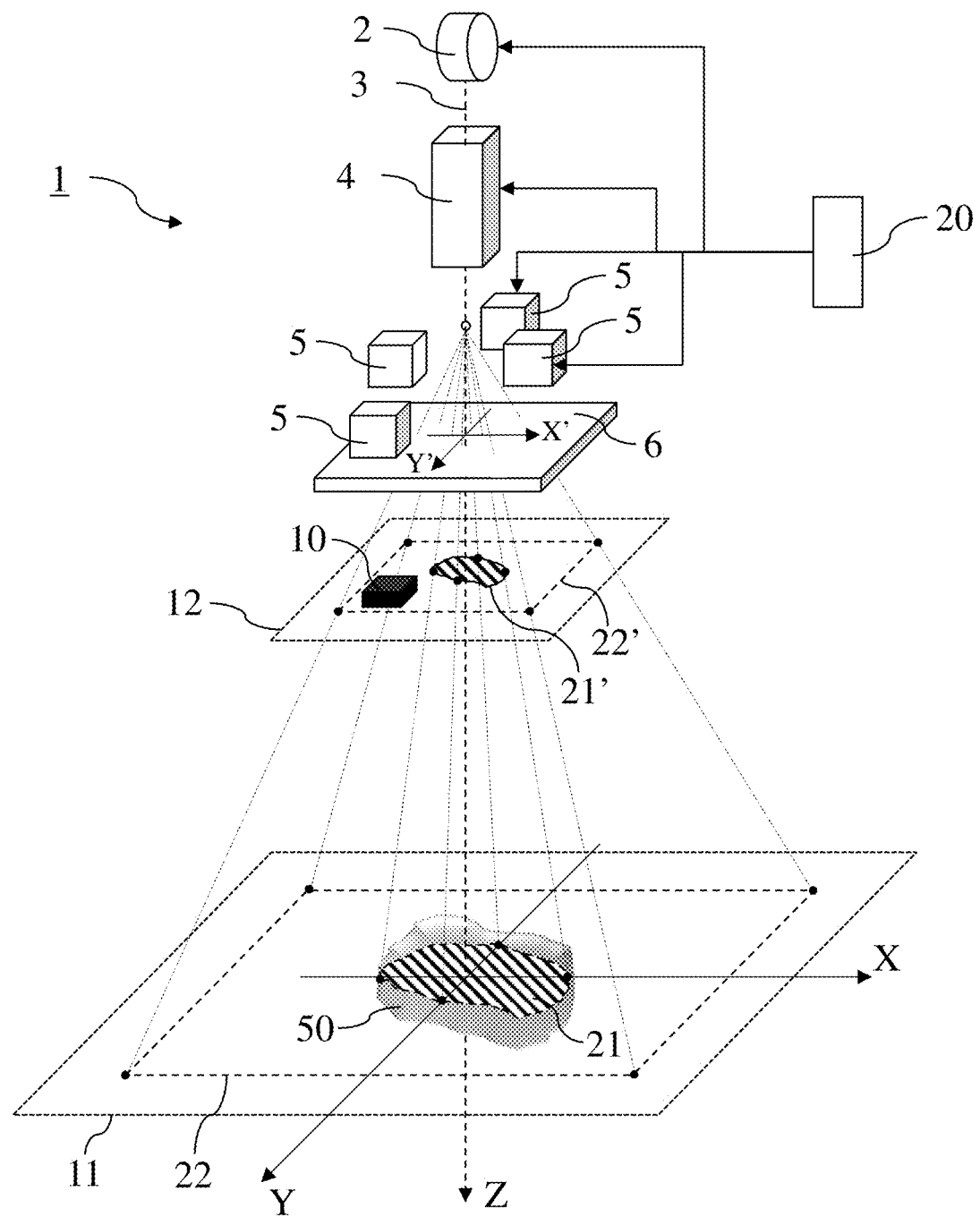
FIG. 1 schematically shows an exemplary apparatus according to the present disclosure.

FIG. 1 schematically shows an exemplary particle therapy apparatus (1) according to the present disclosure. The apparatus (1) comprises a particle accelerator (2), for example, a cyclotron or a synchrotron, to deliver a charged particle beam, for example, a beam of protons or of carbon ions.

The apparatus (1) also comprises a beam transport system (4) to deliver the charged particle beam (3) according to a main beam axis (Z) to a target (50) in an isocenter plane (11) which is perpendicular to the main beam axis (Z). The target (50) is, for example, a tumor of a patient to be treated.

The apparatus (1) further comprises scanning magnets (5) to scan the charged particle beam (3) over the target (50), a beam position detector (6) arranged downstream of the scanning magnets (5) and adapted to detect an X and Y position of the charged particle beam (3) when it crosses the detector (6), a beam stopper (10) arranged downstream of the beam position detector (6), the beam stopper (10) being adapted to stop the charged particle beam (3) when it hits the beam stopper (10), and a control system (20) configured to drive the scanning magnets (5) to scan the charged particle beam (3) over the target (50) according to a pre-defined treatment field which covers a treatment surface (21) in the isocenter plane (11). The control system (20) is further capable to drive the scanning magnets (5) to scan the charged particle beam (3) according to a reachable field which covers a reachable surface (22) in the isocenter plane (11), the reachable surface (22) covering and being larger than the treatment surface (21).

The reachable surface (22) is a surface in the isocenter plane (11) to which the apparatus (1) is able to direct the particle beam (3) by driving its scanning magnets (5) according to the X and Y directions. The reachable surface (22) is, for example, the largest surface in the isocenter plane (11) to which the apparatus (1) is able to direct the particle beam (3) by driving its scanning magnets (5) according to the X and Y directions.

If, for example, a conventional proton therapy apparatus using a Pencil Beam Scanning (PBS) irradiation method is considered, the scanning magnets within a nozzle of such apparatus have the capability of delivering a pencil beam spot anywhere within a reachable surface of up to 400 mm by 300 mm when projected at isocenter in a treatment room. The maximum treatment surface for flash treatment with such apparatus may however be smaller and is, for example, 80 mm by 80 mm.

Such apparatus in itself is well known in the art and will hence not be described further. Specific to the present disclosure is notably the position of the beam stopper and the way the tuning of the beam position is performed, as will be detailed hereafter.

As shown on FIG. 1, the beam stopper (10) is arranged at a position to prevent the charged particle beam from reaching at least a portion of the reachable surface (22) and to allow the charged particle beam to reach any portion of the treatment surface (21). To understand this expression, FIG. 1 shows a projection of the reachable surface (22') and a projection of the treatment surface (21'), both on a plane which is perpendicular to the main beam axis (Z) and where the beam stopper (10) is located (hereafter called the stop plane), the projection being according to the various beam directions when the beam is scanned over the X and Y directions. As further shown in FIG. 1, the beam stopper (10) is arranged in the stop plane (12) at a position in the projection of the reachable surface (22') without being in the projection of the treatment surface (21'). Hence, when the particle beam (3) is directed to the beam stopper (10), it will stop the beam (3) and the beam (3) will not reach the target (50). Whereas, when the particle beam (3) is directed to any point of the treatment surface (21), it will not be stopped by the beam stopper (10) and the beam (3) will reach the target (50) to perform the treatment.

The beam stopper (10) may be a piece of metal, such as brass, for example.

The control system (20) is configured to control the particle therapy apparatus (1) to direct the charged particle beam (3) to the beam stopper (10) and to meanwhile measure an X and Y position of the charged particle beam (3) by using the beam position detector (6), to calculate a difference (or a deviation) between a desired (or planned) X and Y position of the charged particle beam (3) and respectively the measured X and Y position of the charged particle beam (3) when directed to the beam stopper (10), and to scan the charged particle beam (3) over the target (50) according to the pre-defined treatment field by taking into account the calculated difference (or a deviation).

In accordance with some embodiments, the control system (20) is configured to control the particle therapy apparatus (1) to scan the charged particle beam (3) over the target (50) according to the pre-defined treatment field by correcting the beam position according to the difference between the desired X and Y position of the charged particle beam (3) and respectively the measured X and Y position of the charged particle beam (3) when directed to the beam stopper (10).

If the desired or planned X position of the beam is, for example, 125 (fictitious value) and the measured X position of the beam (3) is, for example, 130 (fictitious value) when the beam (3) is directed to the beam stopper (10), the control system (20) may correct the magnetic settings of the X scanning magnet (5) to compensate for the difference, notably to cancel or reduce the difference between both values. The same holds by analogy for the Y position of the beam (3) and the Y scanning magnet (5).

Once the difference or deviation between the desired X and Y position of the charged particle beam (3) and respectively the measured X and Y position of the charged particle beam (3) for a reference point (here the position of the beam stopper (10)) is known, the correction to be applied to the magnetic settings of the X and Y scanning magnets (5) is generally known in the art, for example, from EP2552545B1 which is incorporated herein by reference.

In accordance with some embodiments, when the apparatus is in operation, the beam stopper (10) is kept in place while the charged particle beam (5) is scanned over the target according to the pre-defined treatment field.

In accordance with some embodiments, the beam stopper (10) is arranged as close as possible to the main beam axis (Z), without of course overlapping the projection of the treatment surface (21') on the stop plane. As is generally conventional, the main beam axis (Z) is the axis of an unscanned particle beam, i.e., when the beam crosses the isocenter, as shown in FIG. 1, for example.

The beam stopper (10) may be arranged anywhere lengthwise (along the beam path) between the detector (6) and the target (50). Preferably, the beam stopper (10) is part of the apparatus (1) or mounted on the apparatus (1).

In accordance with some embodiments, the therapy apparatus (1) comprises a beam shaping device arranged downstream of the beam position detector (6). The beam shaping device may, for example, be a ridge filter, and/or a range shifter, and/or a compensator, and/or a collimator, which are generally known in the art and serve to shape and/or to modulate the particle beam before it reaches the target.

In accordance with some embodiments, the beam stopper (10) is an integral part of the beam shaping device or of one of the beam shaping devices, or is attached to the beam shaping device or to one of the beam shaping devices, preferably removably attached to the beam shaping device or to one of the beam shaping devices.

In accordance with some embodiments, the beam stopper (10) is placed in an accessory holder fixed to a part of the particle therapy apparatus (1), preferably to a nozzle of the particle therapy apparatus (1).

In accordance with some embodiments, the beam shaping device comprises a ridge filter and a collimator, the collimator being preferably arranged downstream of the ridge filter. In such a case, beam stopper (10) is, for example, an integral part of the collimator or is attached to the collimator, preferably removably attached to the collimator.

Figure 2:
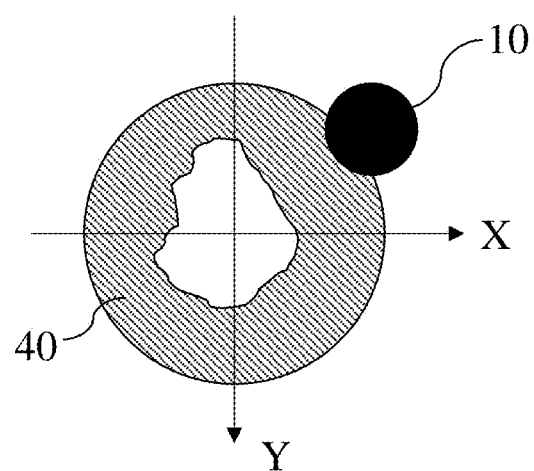
FIG. 2 schematically shows a cross section of an exemplary beam shaping device comprising a beam stopper according to the present disclosure.

In accordance with some embodiments, the collimator has an annular shape as, for example, disclosed in EP2532385B1. In such a case, the beam stopper (10) may, for example, be a portion of this collimator or be placed next to the outer lateral surface of the collimator. FIG. 2 schematically shows a cross section of an exemplary collimator (40) comprising a beam stopper (10) according to the present disclosure. The collimator (40) has an annular shape with a central opening (aperture) whose shape depends on the shape of the target and defines a passageway for the particle beam to the target during treatment. In this embodiment, the beam stopper (10) has the shape of a "bulge" to the collimator ring (40). This bulge preferably has a diameter of at least 10*sigma so that when the particle beam hits the center of the bulge, it will be blocked by the bulge. Generally speaking, in order to account for possible errors on the position of the beam before tuning said position, the size of the beam stopper (10) should preferably have enough margin compared to the size of the beam spot at the location of the beam stopper. Therefore, the size of the beam stopper (10) is preferably selected according to the size of the beam spot foreseen by a treatment plan.

In accordance with some embodiments, the control system is configured to control the particle apparatus to deliver the pre-defined treatment field to the target by scanning the charged particle beam over the target in a single scan.

Referring again to FIG. 1, the present disclosure also concerns a method for tuning the position of a charged particle beam (3) in a particle therapy apparatus (1), the particle apparatus (1) comprising:
  a particle accelerator (2) to deliver a charged particle beam;

a beam transport system (4) to deliver the charged particle beam according to a main beam axis (Z) to a target (50) in an isocenter plane (11) which is perpendicular to the main beam axis (Z);

scanning magnets (5) to scan the charged particle beam over the target;

a beam position detector (6) arranged downstream of the scanning magnets and adapted to detect an X and Y position of the charged particle beam when it crosses the detector;

a beam stopper (10) arranged downstream of the beam position detector, the beam stopper being adapted to stop the charged particle beam when it hits the beam stopper; and a control system (20) configured to drive the scanning magnets to scan the charged particle beam over the target according to a pre-defined treatment field which covers a treatment surface (21) in the isocenter plane (11), the control system being further capable to drive the scanning magnets to scan the charged particle beam according to a reachable field which covers a reachable surface (22) in the isocenter plane (11), the reachable surface (22) covering and being larger than the treatment surface (21).

The method comprises the following steps:

placing the beam stopper (10) at a position to prevent the charged particle beam from reaching at least a portion of the reachable surface (22) and to allow the charged particle beam to reach any portion of the treatment surface (21), directing the charged particle beam to the beam stopper and meanwhile measure an X and Y position of the charged particle beam by using the beam position detector, calculating a difference between a desired X and Y position of the charged particle beam and respectively the measured X and Y position of the charged particle beam when directed to the beam stopper, applying a correction to the magnetic settings of the X and Y scanning magnets by taking into account the calculated difference between the desired X and Y position of the charged particle beam and the measured X and Y position of the charged particle beam when directed to the beam stopper.

The present disclosure has been described in terms of specific embodiments, which are illustrative of the present disclosure and not to be construed as limiting. More generally, it will be appreciated by persons skilled in the art that the present disclosure is not limited by what has been particularly shown and/or described hereinabove.

Reference numerals in the claims do not limit their protective scope.

Use of the verbs "to comprise", "to include", "to be composed of", or any other variant, as well as their respective conjugations, does not exclude the presence of elements other than those stated.

Use of the article "a", "an" or "the" preceding an element does not exclude the presence of a plurality of such elements.

The present disclosure may also be described as follows: a particle therapy apparatus configured to scan a charged particle beam over a target according to a pre-defined treatment field which covers a treatment surface in an isocenter plane of the apparatus. The apparatus is capable of scanning the beam over a reachable surface which covers and is larger than the treatment surface. A beam stopper is arranged downstream of the scanning magnets of the apparatus, at a position to prevent the beam from reaching at least a portion of the reachable surface and to allow the beam to reach any portion of the treatment surface. A control system is configured to control the apparatus to direct the beam to the beam stopper and to meanwhile measure a position of the beam, to calculate a difference between a desired position and the measured position of the beam when directed to the beam stopper, and to scan the beam over the target according to the pre-defined treatment field by taking into account the calculated difference.

What is claimed is:

1. A particle therapy apparatus comprising:

a particle accelerator to deliver a charged particle beam;

a beam transport system to deliver the charged particle beam according to a main beam axis (Z) to a target in an isocenter plane which is perpendicular to the main beam axis (Z);

scanning magnets to scan the charged particle beam over the target;

a beam position detector arranged downstream of the scanning magnets and adapted to detect an X and Y position of the charged particle beam when it crosses the detector;

a beam stopper arranged downstream of the beam position detector, the beam stopper being adapted to stop the charged particle beam when it hits the beam stopper;

a control system configured to drive the scanning magnets to scan the charged particle beam over the target according to a pre-defined treatment field which covers a treatment surface in the isocenter plane, the control system being further capable to drive the scanning magnets to scan the charged particle beam according to a reachable field which covers a reachable surface in the isocenter plane, the reachable surface covering and being larger than the treatment surface, wherein the beam stopper (10) is arranged at a position to prevent the charged particle beam from reaching at least a portion of the reachable surface (22) and to allow the charged particle beam to reach any portion of the treatment surface (21), and wherein the control system is configured to control the particle therapy apparatus:

to direct the charged particle beam to the beam stopper and to meanwhile measure an X and Y position of the charged particle beam by using the beam position detector, to calculate a difference between a desired X and Y position of the charged particle beam and respectively the measured X and Y position of the charged particle beam when directed to the beam stopper, and to scan the charged particle beam over the target according to the pre-defined treatment field by taking into account the calculated difference.

2. The particle therapy apparatus of claim 1, wherein the control system is configured to control the particle therapy apparatus to scan the charged particle beam over the target according to the pre-defined treatment field by correcting the beam position according to the difference between the desired X and Y position of the charged particle beam and the measured X and Y position of the charged particle beam when directed to the beam stopper.

3. The particle therapy apparatus of claim 1, wherein, when in operation, the beam stopper is kept in place while the charged particle beam is scanned over the target according to the pre-defined treatment field.

4. The particle therapy apparatus of claim 1, wherein the beam stopper is arranged as close as possible to the main beam axis (Z).

5. The particle therapy apparatus of claim 1, further comprising a beam shaping device arranged downstream of the beam position detector.

6. The particle therapy apparatus of claim 5, wherein the beam shaping device comprises a ridge filter, and/or a range shifter, and/or a compensator, and/or a collimator.

7. The particle therapy apparatus of claim 5, wherein the beam stopper is an integral part of the beam shaping device or of one of the beam shaping devices or is attached to the beam shaping device or to one of the beam shaping devices.

8. The particle therapy apparatus of claim 5, wherein the beam shaping device comprises a ridge filter and a collimator.

9. The particle therapy apparatus of claim 8, wherein the collimator is arranged downstream of the ridge filter.

10. The particle therapy apparatus of claim 8, wherein the beam stopper is an integral part of the collimator or is attached to the collimator.

11. The particle therapy apparatus of claim 10, wherein the collimator has an annular shape.

12. The particle therapy apparatus of claim 1, wherein the beam stopper is placed in an accessory holder fixed to a part of the particle therapy apparatus.

13. The particle therapy apparatus of claim 12, wherein the beam stopper is placed in an accessory holder fixed to a nozzle of the particle therapy apparatus.

14. The particle therapy apparatus of claim 1, wherein the control system is configured to control the particle apparatus to deliver the pre-defined treatment field to the target by scanning the charged particle beam over the target in a single scan.

15. The particle therapy apparatus of claim 1, wherein the particle accelerator is a cyclotron or a synchrotron.

16. The particle therapy apparatus of claim 1, wherein the charged particle beam is a beam of protons or of carbon ions.

17. A method for tuning a position of a charged particle beam in a particle therapy apparatus,
wherein the particle apparatus comprises:
a particle accelerator to deliver a charged particle beam;
a beam transport system to deliver the charged particle beam according to a main beam axis (Z) to a target in an isocenter plane which is perpendicular to the main beam axis (Z);
scanning magnets to scan the charged particle beam over the target;
a beam position detector arranged downstream of the scanning magnets and adapted to detect an X and Y position of the charged particle beam when it crosses the detector;
a beam stopper arranged downstream of the beam position detector, the beam stopper being adapted to stop the charged particle beam when it hits the beam stopper;
a control system configured to drive the scanning magnets to scan the charged particle beam over the target according to a pre-defined treatment field which covers a treatment surface in the isocenter plane, the control system being further capable to drive the scanning magnets to scan the charged particle beam according to a reachable field which covers a reachable surface in the isocenter plane, the reachable surface covering and being larger than the treatment surface,
and the method comprising the steps of:
placing the beam stopper at a position to prevent the charged particle beam from reaching at least a portion of the reachable surface and to allow the charged particle beam to reach any portion of the treatment surface,
directing the charged particle beam to the beam stopper and meanwhile measuring an X and Y position of the charged particle beam by using the beam position detector,
calculating a difference between a desired X and Y position of the charged particle beam and respectively the measured X and Y position of the charged particle beam when directed to the beam stopper, and
applying a correction to the magnetic settings of the X and Y scanning magnets by taking into account the calculated difference between the desired X and Y position of the charged particle beam and respectively the measured X and Y position of the charged particle beam when directed to the beam stopper.

* * * * *